US012127496B2

(12) United States Patent
Ohlsen

(10) Patent No.: US 12,127,496 B2
(45) Date of Patent: Oct. 29, 2024

(54) MECHANISM FOR DISPENSING BIOLOGICAL MATERIAL

(71) Applicant: Syddansk Universitet, Odense M (DK)

(72) Inventor: Niels Lennart Ohlsen, Svendborg (DK)

(73) Assignee: Syddansk Universitet, Odense M (DK)

( * ) Notice: Subject to any disclaimer, the term of this patent is extended or adjusted under 35 U.S.C. 154(b) by 549 days.

(21) Appl. No.: 17/594,722

(22) PCT Filed: May 6, 2020

(86) PCT No.: PCT/EP2020/062588
§ 371 (c)(1),
(2) Date: Oct. 27, 2021

(87) PCT Pub. No.: WO2020/225307
PCT Pub. Date: Nov. 12, 2020

(65) Prior Publication Data
US 2022/0201929 A1   Jun. 30, 2022

(30) Foreign Application Priority Data

May 7, 2019 (EP) .................................. 19172981

(51) Int. Cl.
*A01C 17/00* (2006.01)
*A01M 9/00* (2006.01)
(Continued)

(52) U.S. Cl.
CPC ......... *A01C 17/003* (2013.01); *A01M 9/0061* (2013.01); *A01M 9/0069* (2013.01);
(Continued)

(58) Field of Classification Search
CPC . A01C 17/003; A01M 9/0061; A01M 9/0069; B64D 1/16
See application file for complete search history.

(56) References Cited

U.S. PATENT DOCUMENTS

| 4,260,108 A | 4/1981 | Maedgen, Jr. |
| 5,148,989 A | 9/1992 | Skinner |

(Continued)

FOREIGN PATENT DOCUMENTS

| CA | 715893 A | 8/1965 |
| CN | 201354735 Y | 12/2009 |

(Continued)

OTHER PUBLICATIONS

International Search Report for PCT/EP2020/062588 dated Jun. 29, 2020.

(Continued)

*Primary Examiner* — J C Jacyna
(74) *Attorney, Agent, or Firm* — Knobbe Martens Olson & Bear LLP

(57) ABSTRACT

A dispenser unit (1) for dispensing biological material, e.g. larvae or insects etc. The dispenser unit has a rotary arrangement (2) with a drive shaft (3) and a plurality of protruding vanes (4) positioned inside a housing (10) for encasing the rotary arrangement to form chambers (5) for containing biological material between respective neighbouring vanes and an inner wall (11) of the housing. A track (6) on the housing serves to engage with each vane or movable element to control the volume of the chamber between an inlet opening (20) in a top part of the housing and an outlet opening (21) in a bottom part of the housing. This allows the biological material to be received in the chambers at the inlet opening (20) and dispensed from the chambers (5) at the outlet opening (21) during rotation of the rotary arrangement. The dispensing unit is designed to provide for an expanding chamber volume as the chambers are being rotated from the inlet opening to the outlet opening. The dispenser unit has proven to provide a low mortality e.g. for (Continued)

dispensing living larvae. It can be transported by a drone or the like to spread biological material over a large area.

13 Claims, 17 Drawing Sheets

(51) Int. Cl.
  *B64C 39/02* (2023.01)
  *B64D 1/16* (2006.01)
  *B64U 10/13* (2023.01)
  *B64U 30/20* (2023.01)
  *B64U 101/60* (2023.01)

(52) U.S. Cl.
  CPC .............. *B64C 39/024* (2013.01); *B64D 1/16* (2013.01); *B64U 10/13* (2023.01); *B64U 30/20* (2023.01); *B64U 2101/60* (2023.01)

(56) References Cited

U.S. PATENT DOCUMENTS

| | | | |
|---|---|---|---|
| 6,036,462 | A | 3/2000 | Mallen |
| 6,038,998 | A | 3/2000 | Platsch |
| 2007/0224067 | A1 | 9/2007 | Arnold et al. |
| 2013/0186988 | A1* | 7/2013 | Dube .................. A01C 17/003 239/672 |
| 2014/0303814 | A1 | 10/2014 | Burema et al. |
| 2016/0260207 | A1 | 9/2016 | Fryshman |
| 2018/0352726 | A1* | 12/2018 | Chini .................. A01C 17/003 |
| 2019/0037828 | A1* | 2/2019 | Bennett .................. A01B 79/00 |
| 2019/0092471 | A1 | 3/2019 | Lepek et al. |
| 2020/0288695 | A1* | 9/2020 | Shinomiya ............ B64C 39/024 |

FOREIGN PATENT DOCUMENTS

| | | |
|---|---|---|
| CN | 206165605 U | 5/2017 |
| CN | 206984373 U | 2/2018 |
| CN | 107914877 A | 4/2018 |
| CN | 208233367 U | 12/2018 |
| CN | 109476063 A | 3/2019 |
| CN | 110294126 A | 10/2019 |
| CN | 210852928 U | 6/2020 |
| FR | 3103679 A1 | 6/2021 |
| GB | 2394006 A | 4/2004 |
| TW | 201818804 A | 6/2018 |
| TW | 201840369 A | 11/2018 |
| WO | WO 2017/106903 A1 | 6/2017 |
| WO | WO 2017/136063 A1 | 8/2017 |
| WO | WO 2017/154004 A1 | 9/2017 |
| WO | WO 2018/154004 A9 | 8/2018 |
| WO | WO 2020/225307 A1 | 11/2020 |

OTHER PUBLICATIONS

International Preliminary Report on Patentability for PCT/EP2020/062588 dated Nov. 18, 2021.

* cited by examiner

MECHANISM FOR DISPENSING BIOLOGICAL MATERIAL

CROSS REFERENCE TO RELATED APPLICATIONS

This application is a U.S. National Phase Application of PCT International Application Number PCT/EP2020/062588, filed on May 6, 2020, designating the United States of America and published in the English language, which is an International Application of and claims the benefit of priority to European Patent Application No. 19172981.3, filed on May 7, 2019. The disclosures of the above-referenced applications are hereby expressly incorporated by reference in their entireties.

FIELD OF THE INVENTION

The present invention relates to a dispenser unit which is suitable for dispensing biological material, such as for dispensing larvae or insects onto an agricultural area. More specifically the dispenser unit is suitable for mounting on a UAV, such as a drone, so as to quickly and effortlessly dispense the biological material on a large surface area by letting the UAV pass over the surface area while performing the dispensing.

BACKGROUND OF THE INVENTION

All over the world, the population of pollinating bees are declining. The National Agriculture Statistics Service reported 2.44 million honey-producing hives in the United States in February 2008, down from 4.5 million in 1980, and 5.9 million in 1947. According to the Agriculture and Consumer Protection Department of the Food and Agriculture Organization of the United Nations, the worth of global crops with honeybee pollination was estimated at close to $200 billion in 2005. Speculation has surrounded a family of pesticides called neonicotinoids as having caused the decreasing amount of hives both in the US and in Northern Europe.

The use of pesticides to manage pest problems is a common practice around the world. In Denmark, all the country's drinking water is supplied from sub-terrain groundwater reservoirs and in 2017 and 2018 traces of pesticides used since 1930 have been discovered in reservoirs all over the country, contaminating the fresh water supply and potentially endangering the safety of the consumers.

A known substitute for herbicides and insecticides is the dispersion of natural predators, relative to the pest, e.g. mites that eat the eggs of harmful insects, ladybugs that feed on soft-bodied harmful larvae or bees that pollinate the crops and thereby increase the yield of a field. One of the current problems with the dispersion of living insects or larvae is the dispersion rate and the mortality rate. Dispensing insects by hand is a gentle but labor-intensive method and mechanical dispensing is difficult to accomplish without harming or killing the living insects.

Hence, an improved method of pest control within agriculture would be advantageous, and in particular, a more eco-friendly and non-toxic method, preferably with none or at least low long-term impact on the environment, would be advantageous.

OBJECT OF THE INVENTION

In particular, it may be seen as an objective of the present invention to provide a dispensing unit suitable for dispensing biological material that solves the above-mentioned problems of the prior art with a lowered mortality rate for the dispensed biological material as a result of the gentle dispensing method enabled by the apparatus.

SUMMARY OF THE INVENTION

Thus, the above-described objective and several other objectives are intended to be obtained in a first aspect of the invention by providing a dispenser unit for dispensing biological material, especially living insects or larvae, said dispenser unit comprising:

a rotary arrangement with a drive shaft and a plurality of protruding vanes, such as 3-50 vanes, extending radially away from the drive shaft,
  a housing for encasing at least a part of the rotary arrangement to form chambers adapted to contain biological material between respective neighbouring vanes and an inner wall of the housing, wherein the rotary arrangement is rotatably mounted in relation to the housing, and wherein the inner wall of the housing comprises a front wall, a rear wall arranged at a distance along the drive shaft from the front wall, and a circumferential wall,
  an inlet opening in the circumferential wall in a top part of the housing and being arranged to receive biological material into at least one of said chambers at a time, the inlet opening facing upwards when the dispenser unit is in use, so that the biological material can enter a chamber temporarily located below the inlet opening by gravitational forces acting on the biological material,
  an outlet opening placed in a bottom part of the housing to allow the biological material to be dispensed from the chambers during rotation of the rotary arrangement the outlet opening facing downwards when the dispenser unit is in use, so that the biological material can exit a chamber temporarily located above the outlet opening by gravitational forces acting on the biological material, and
  a track, such as an indentation or protrusion, formed on the inside of the front wall and/or of the rear wall of the housing, the track engaging with a corresponding protrusion or indentation on each vane so as to vary the position of that vane relative to the rotary drive shaft, wherein the rotary arrangement is eccentrically mounted in relation to a centre of a cross section of the circumferential wall of the housing perpendicular to the axis of rotation of the drive shaft, wherein the vanes are slidably mounted in respective slits of a central body of the rotary arrangement, so as to allow lengths of the vanes to vary during a revolution of the rotary arrangement in order for an end of each vane to be able to remain adjacent to the circumferential wall during movement from the inlet opening to the outlet opening to maintain a closed chamber, and wherein the track is shaped and arranged so that for each of the chambers, the volume increases when the chamber is moved from a location below the inlet opening to a location above the outlet opening.

In the following, the terms "dispenser unit" and "dispensing unit" are used interchangeably.

The invention is particularly, but not exclusively, advantageous for obtaining a gentle, even and controlled method of dispensing living insects or larvae with a low mortality rate, such as below 5%, as verified in laboratory tests for gall midge larvae. As the vanes rotate, they carefully guide the biological material from the inlet opening towards the outlet opening and thereby ensures a regular and even dispensing.

In the context of the present invention, 'biological material' is preferably to be understood as larvae, mites, insects, eggs, worms, etc. However, the dispenser unit will also be suitable for the dispensing of other kinds of material, such as particulate material. It has been found advantageous to provide such biological material in combination with a particulate carrier material, such as vermiculite which is a hydrous phyllosilicate mineral.

In the context of the present invention, a 'vane' is to be understood as a thin, flat or curved object that is rotated about an axis to cause a flow of material temporarily located between two vanes. In the present invention, the vanes cause a flow of biological material from the inlet towards the outlet. In an embodiment, the rotary arrangement comprises at least three vanes, such as, but not limited to 3-50 vanes, 4-40 vanes, 5-20 vanes, or 5-15 vanes. In an advantageous embodiment, the vanes are uniformly distributed on the rotary arrangement.

In the context of the present invention, 'chamber' is to be understood as the compartment defined by two neighbouring vanes and the inside walls of the housing. By 'closed chamber' is to be understood that the chamber is closed to such an extent that the biological material cannot move out of the chamber while it is closed. In the context of the present invention, a closed chamber is preferably not fluid tight. This means that the pressure inside a chamber will typically remain substantially constant at the ambient pressure despite the change in volume of the chamber when it is moved between the inlet opening and the outlet opening. This is particularly important when handling living material, such as beneficial animals, which is sensitive to pressure changes. If the pressure increased, such beneficial animals would be compressed resulting in an increased mortality; this should be avoided. Furthermore, the increasing volume minimizes the risk of squeezing the biological material during the rotation.

In the context of the present invention, 'drive shaft' is a rod or shaft that translates mechanical power from e.g. an electric motor to a connected element, in this instance, the rotary arrangement.

In the context of the present invention, 'slits' are to be understood as narrow cuts or openings corresponding to the geometry of a vane enabling each slit to receive and conceal or hide at least a part of a vane.

By the 'length' of a vane is preferably meant a distance along a side of a vane between the rotary drive shaft and the circumferential wall of the housing. A vane may consist of an elongated element of fixed length sliding along a slit thereby resulting in a varying length in dependence on the length of the side of the chamber being partly delimited by that vane.

In the context of the present invention, 'eccentrically' is preferably meaning non-concentric geometries so as to allow for variation of radial position of elements with respect to one another during the course of a revolution.

The first aspect of the invention may alternatively be provided by a dispenser unit for dispensing biological material, especially living insects or larvae, said dispenser unit comprising:
  a rotary arrangement with a drive shaft and a plurality of protruding vanes, such as 3-50 vanes, having fixed lengths and extending radially away from the drive shaft,
  a housing for encasing at least a part of the rotary arrangement to form chambers adapted to contain biological material between respective neighbouring vanes and an inner wall of the housing, wherein the rotary arrangement is rotatably mounted in relation to the housing, and wherein the inner wall of the housing comprises a front wall, a rear wall arranged at a distance along the drive shaft from the front wall, and a circumferential wall,
  a plurality of movable elements each arranged between two neighbouring vanes so that it forms an inner side of the respective chamber, the inner side being opposite to an outer side of the respective chamber being formed by the circumferential wall of the housing,
  an inlet opening in the circumferential wall in a top part of the housing and being arranged to receive biological material into at least one of said chambers at a time, the inlet opening facing upwards when the dispenser unit is in use, so that the biological material can enter a chamber temporarily located below the inlet opening by gravitational forces acting on the biological material,
  an outlet opening placed in a bottom part of the housing to allow the biological material to be dispensed from the chambers during rotation of the rotary arrangement, the outlet opening facing downwards when the dispenser is in use, so that the biological material can subsequently exit a chamber temporarily located above the outlet opening by gravitational forces acting on the biological material, and
  a track, positioned eccentrically relative to the axis of rotation of the drive shaft, formed on the inside of the front wall and/or of the rear wall of the housing, the track engaging with a corresponding protrusion or indentation on each movable element so as to vary the radial position of that movable element relative to the rotary drive shaft during a revolution of the rotary arrangement,
wherein the track is shaped and arranged so that for each of the chambers, the volume increases when the chamber is moved from a location below the inlet opening to a location above the outlet opening.

In the context of the present invention 'track' is to be understood as a guiding mechanism arranged for engaging with part of the vanes or part of the moving elements, so as to guide the vanes or moving elements in a direction perpendicular to the rotational axis of the rotary arrangement. It could therefore also be referred to as a 'guide track'.

In the context of the present invention, a 'movable element' is to be understood as a solid piece of material such as, but not limited to a block, pad or brick. In presently preferred embodiments of the invention having movable elements, the rotary arrangement comprises a vane carrier on which the vanes are arranged, a surface of the vane carrier between the vanes forming part of an inner front side or rear side of the chambers so that the movable elements slide along this surface of the vane carrier, and the vane carrier comprising a central opening exposing the track so that it can engage with the protrusions or indentations of the movable elements. By such a design, the friction between moving and stationary parts of the dispenser unit can be minimized compared to a design without such a vane carrier, as there is no mutual movement between the vanes and the surface of the vane carrier. They may e.g. be integrally made as one unit. This is particularly relevant when the dispenser unit is used for dispensing abrasive material as the wear of the material, from which the dispenser unit is made, due to friction can hereby be minimized. A further advantage is that the biological material can be transported with a lower risk of disadvantageous frictional contact with a moving surface which friction may result in an increased mortality of the living material which is sensitive to movement during handling.

The track may be provided on a track carrier forming part of the front or the rear wall. An example of such an embodiment will be shown in figures. This may be particularly advantageous for some manufacturing processes, such as 3D printing. In preferred embodiments, a cutout in an inner surface of the circumferential wall of the housing provides for a gap between the vanes and the housing at the region after the inlet opening in the rotational orientation of the rotational arrangement, so as not to squeeze or cut material just entering through the inlet opening.

In an advantageous embodiment, the vane tips at the ends adjacent to the circumferential wall are chamfered or rounded to minimize contact with the biological material at the inlet opening to further reduce the force applied to the biological material.

In an advantageous embodiment which is particularly relevant in relation to the dispensing of beneficial animals, such as larvae, the distance between tips of neighbouring vanes is selected such that the chamber size does not put unnecessary stress on the beneficial animals to be distributed, and such that unwanted bleeding (dispersion after the rotor has been stopped) is minimized.

In some embodiments of the invention, the outlet opening may extend to a position on the circumferential wall where the downwardly facing side of a vane forming an inner side of a chamber reaching that position, when being moved towards the outlet opening, has not yet reached a horizontal orientation. Hereby it can be ensured that the biological material begins the exiting phase from the chamber through the outlet opening before it by gravity is forced towards the circumferential wall where it could experience stressful friction. Such influence could kill sensitive animals and should therefore be avoided.

In some embodiments of the invention, the circumferential wall at the outlet may be provided with a cutout, gradually widening an outlet area as the chambers pass the outlet opening, so that the outlet area from the chambers increases continuously in size from no opening to a full size opening to facilitate that a uniform flow of biological material out of the outlet opening can be obtained.

In an advantageous embodiment, the dispenser unit further comprises:

a detachable container, for storage of biological material to be dispensed, the container being arranged for attachment, manually or mechanized, to and detachment from the housing for application of the biological material to the inlet opening of the housing. This would e.g. allow for the container being suitable for storage in a temperate environment, such as a cooling box. In this embodiment, the container is able to be quickly removed from the temperature-controlled environment and snapped onto the dispensing unit so as to reduce the exposure time of the biological material to the atmosphere before being dispersed onto the designated area.

In a more advantageous embodiment, the dispenser unit and detachable container engage by a twist on-twist off attachment mechanism, the attaching mechanism further comprising a shutter mechanism having two modes:

a first mode wherein the container is not attached to the dispensing unit and wherein the shutter mechanism is closed, preventing biological material to escape from the container, and a second mode wherein the container is attached to the dispensing unit and wherein the shutter mechanism is open, enabling a transfer of biological material from the container to a chamber within the dispensing unit.

In the context of the present invention 'shutter mechanism' is to be understood as a mechanism that is able to divide two volumes, such as but not limited to a hatch, trapdoor or shutter.

In another advantageous embodiment, the driving motor is added to the assembly by a twist on-twist off attachment, allowing for easy assembly and maintenance.

In another advantageous embodiment, the housing side is mountable to a main housing by a twist on-twist off attachment, allowing for easy assembly and maintenance.

In an advantageous embodiment, the dispensing unit further comprises an elongate element arranged for fixation to a part of the housing, so as to allow the dispenser unit to be attached to a UAV, such as a drone.

In the context of the present invention, 'elongate element' is to be understood as a member connecting the dispensing unit to the UAV, such as, but not limited to a rod, beam, pipe, tubing, bar or rod.

In an advantageous embodiment, the dispensing unit further comprises: an electric motor connected to the drive shaft and arranged to rotate the rotary arrangement, and a controller arranged to start, stop, and control the speed of the electric motor. In a more advantageous embodiment, the controller is arranged to control the motor for adjusting the rotational speed of the rotary arrangement, so as to adjust the pace of the biological material dispensed from the outlet opening. Especially, the dispensing unit further comprises a sensor being arranged to measure a horizontal and/or a vertical velocity of the dispenser unit, wherein said sensor is connected to the controller, and wherein the controller is arranged to adjust the pace of the material dispensed from the outlet opening, relative to the horizontal and/or vertical velocity of the dispenser unit.

In an embodiment, the outlet opening in the bottom part of the housing is larger than the inlet opening in the top part of the housing so as to ensure sufficient time for emptying the chamber and dispersing the biological material before the chamber revolves towards the inlet opening.

In an embodiment, the inlet opening and outlet opening are dimensioned so as to expose at least one chamber at a time so as to ensure sufficient time to both fill and exit the biological material from the chambers. The relevant dimensions used will be determined during the design process and in relation to the rotational speed of the rotational arrangement for a given dispensing unit. The choice of these design parameters will also depend on the characteristics of the biological material to be dispensed, including any carrier material if present.

In an embodiment, the total active volume of the dispenser unit is at least 1 $cm^3$, such as at least 5 $cm^3$, such as at least 10 $cm^3$, such as at least 100 $cm^3$, such as at least 1000 $cm^3$ or such as at least 10000 $cm^3$. In preferred embodiments, e.g. suited for drone transport, the total active volume is preferably such as 5 $cm^3$ to 500 $cm^3$.

In an embodiment, the diameter of the rotary arrangement, from an outer edge of a first vane to the outer edge of a second vane, wherein the second vane is diagonal to the first vane, is at least 5 cm, such as at least 10 cm, such as 5-20 cm, such as such as 5-30 cm, such as at least 100 cm, or such as at least 200 cm.

In an embodiment, the housing of the dispensing unit is formed of at least two corresponding parts, such as the housing being formed by only two corresponding monolithic parts.

In an embodiment, the track is formed as a groove in one of the parts forming the housing.

In an embodiment, the rotary arrangement is formed by one single central monolithic element and a plurality of movable vanes arranged in respective slits of the single central monolithic element.

In an embodiment, the housing is formed by a material selected from: a polymer, a plastic, aluminum, compressed biological material such as plant fibers (for instance grass fibers), carbon fibers and steel.

In an embodiment, at least a substantial part of the dispensing unit has been made by 3D printing, such as by 3D printing from Polylactic Acid (PLA). PLA has the advantage that is does not cause the development of harmful gasses during 3D-printing or during later burning after it has been scrapped, nor does it harm biological material.

In an embodiment, each of the vanes or movable elements has a protrusion, such as a pin, protruding towards the front wall and/or the rear wall of the housing, so as to allow engagement with the track for controlling the radial position of the vane or movable element In an embodiment, the rotary arrangement is formed by one single central monolithic element with a plurality of fixed vanes, and with respective movable elements positioned in the space between two neighbouring vanes.

In a second aspect, the present invention relates to a system for dispensing biological material, the system comprising:
- at least one dispenser unit according to the first aspect,
- a motor, such as an electric motor, arranged to drive the rotary arrangement of the at least one dispensing unit, and
- an elongate element arranged for attaching the housing of the at least one dispenser unit to a structure of a vehicle.

In the context of the present invention a 'vehicle' is to be understood as a means of moving the dispensing unit in at least a horizontal direction, such as by, but not limited to, attaching the dispensing unit to an agricultural vehicle such as a tractor or motorized bike, an airplane, a UAV/drone, a helicopter or car.

In some embodiments of the invention, such a system comprises a plurality of dispenser units.

In a system according to the second aspect of the invention, the system may further comprise a blower for each of the at least one dispenser unit, which blower is arranged to blow the biological material exiting the outlet opening away from the dispenser unit and away from the vehicle on which the dispenser unit is attached. By a suitable design, placement and blowing direction of the blower, it can be ensured that the biological material is spread over an area, and by blowing against the direction of flight, the air velocity of the live beneficials is reduced.

In an advantageous embodiment, the system for dispensing biological material further comprises:
- a plurality of dispenser units,
- a UAV, such as a drone, and
- a structure serving to attach the dispenser units to the UAV.

In a third aspect, the present invention relates to a method for dispensing biological material, especially living insects or larvae, the method comprising:

a. providing a container containing biological material, the container being suitable for tempered storage so as to lower the metabolism of the biological material,
b. providing a dispenser unit according to the first aspect,
c. moving the dispenser unit along a path within an area, and
d. dispensing biological material within the area from the dispenser unit moving along the path.

The present invention according to the first aspect may alternatively be used for dispensing other kinds of material, preferably particulate material.

The first, second, and third aspects of the present invention may each be combined with any of the other aspects. These and other aspects of the invention will be apparent from and elucidated with reference to the embodiments described hereinafter.

BRIEF DESCRIPTION OF THE FIGURES

The dispensing unit according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
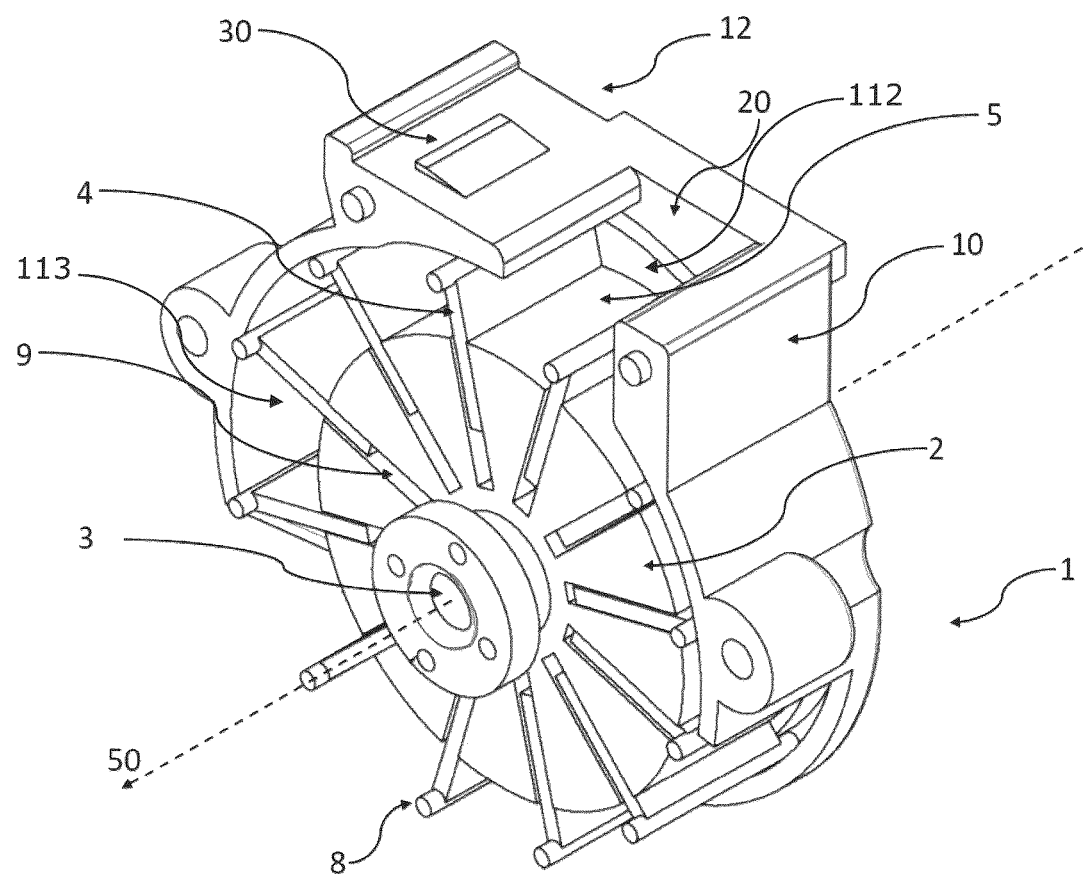
FIG. 1 is a trimetric view of a cross-section of a dispensing unit according to a first embodiment of the invention; the front wall is removed.

FIG. 1 is a trimetric view of a cross-section of a first embodiment of the dispensing unit 1. FIG. 1 shows the housing 10 encasing the rotary arrangement 2 with a drive shaft 3 in the centre of the rotary arrangement 2 and a plurality of protruding vanes 4 arranged distributed uniformly on the rotary arrangement 2. The housing has an inner wall 11 which comprises a front wall (111, not shown FIG. 1), a rear wall 112 arranged at a distance along the drive shaft 3 from the front wall, and a circumferential wall 113. The vanes 4 are positioned within respective slits 9 to allow the vanes 4 to move in a length direction of the slits 9. The vanes 4 form chambers 5 for containing biological material between respective neighbouring vanes 4 and a part of the inner wall of the housing 10. At the top portion 12 of the housing 10 there is an inlet opening 20 in the circumferential wall 113 and arranged to receive biological material into at least one of the chambers 5 at a time. The inlet opening 20 faces upwards when the dispenser unit 1 is in use, so that biological material can enter a chamber 5 temporarily located below the inlet opening 20 by gravitational forces acting on the biological material.

At the top portion 12, there is also a locking mechanism 30 to lock an associated container 40 into place onto the housing 10, the container containing the biological material to be dispensed. This will be described in further details below. In this embodiment, on the end of each vane 4 a vane pin 8 is fixed, enabling control of the movement of the vanes 4 perpendicular to the drive shaft axis 50 during a revolution of the rotary arrangement 2. This means that in the embodiment in FIG. 1, the vane pin 8 forms a protrusion engaging with a track 6 in the form of a recess formed on the rear wall 112 of the housing 10. The track 6 runs along the circumferential wall 113 as is more clearly seen in FIG. 2. Other arrangements of the track 6 and corresponding positions of the protrusion would also be possible within the scope of the invention. Furthermore, the protrusion need not be additional elements fastened to the vanes 4 as in this embodiment. The vanes 4 may alternatively have the protrusions formed as an integral part thereof.

Figure 2:
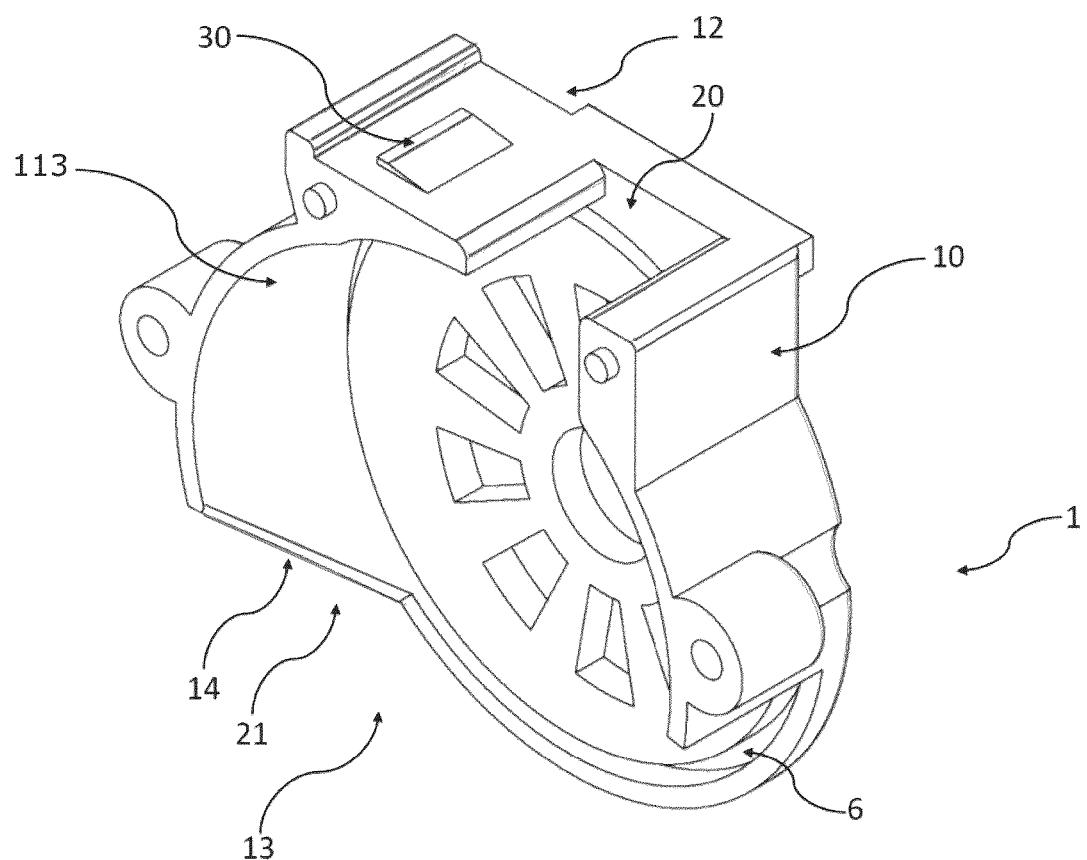
FIG. 2 is a trimetric view of a cross-section of the dispensing unit in FIG. 1 with the rotary arrangement removed.

FIG. 2 is a trimetric view of a cross-section of the dispensing unit 1 in FIG. 1 with the rotary arrangement removed to make the other parts more clearly visible. FIG. 2 shows the circumferential wall 113 and the rear wall 112 of the inner wall 11 of the housing, and the track 6, which in this particular embodiment is a groove in the rear wall 112 of the housing 10, but the track 6 could also be a protrusion. The track 6 serves to engage with the vane pins 8 to control the radial position and thereby the length of the vanes 4 during a rotation. Furthermore, it is shown that the outlet 21 at the bottom portion 13 of the housing 10 has a cutout 14 with an inclined or oblique shape which ensures that the biological material is gradually exposed to the outlet opening 21. Hereby an even flow of the biological material can be obtained. At the top portion 12 of the circumferential wall 113 of the housing 10, an inlet opening 20 is arranged to receive biological material. At the top portion 12, there is also a locking mechanism 30 to lock an associated container 40 into place, i.e. a container with biological material to be dispensed; see FIG. 5.

Figure 3:
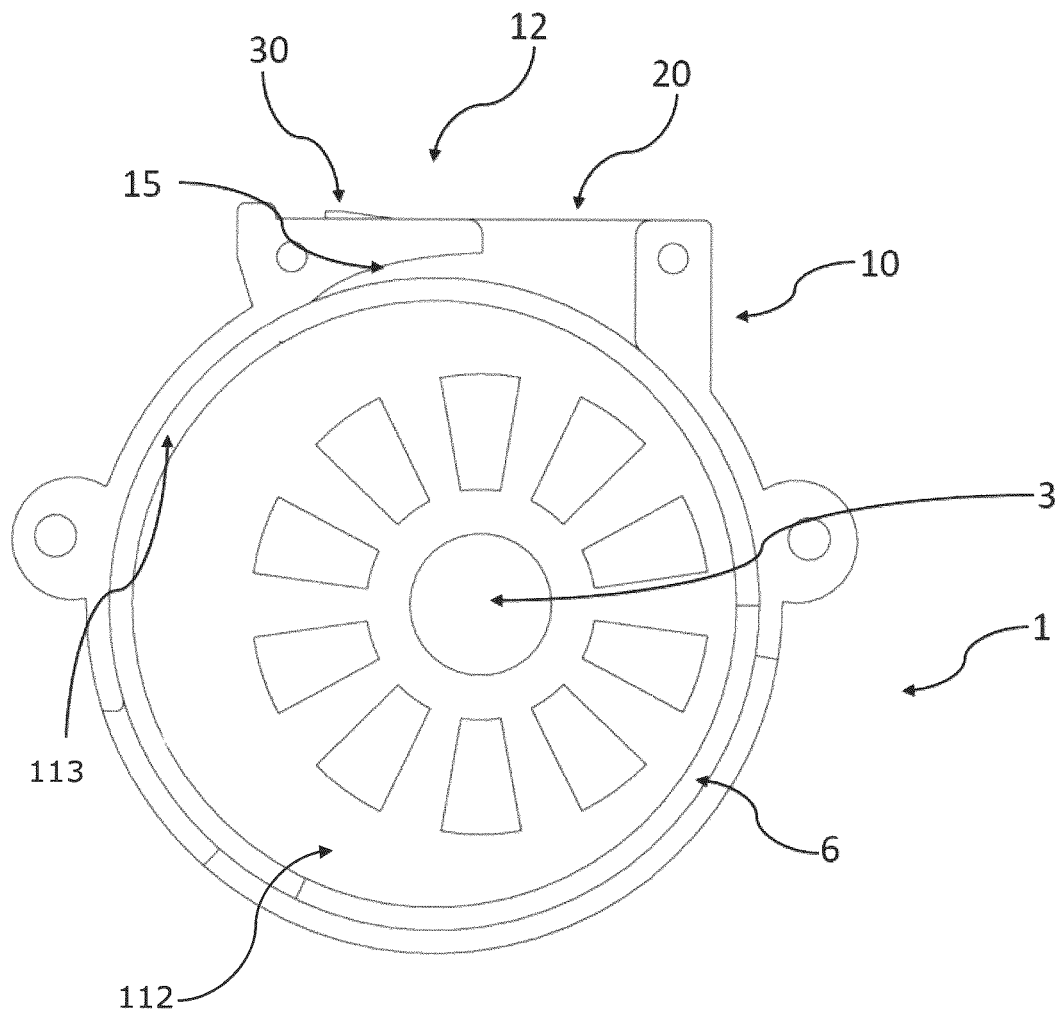
FIG. 3 is a side view of a cross-section of the dispensing unit in FIG. 2.

FIG. 3 is a side view of a cross-section of the dispensing unit 1 in FIG. 2. FIG. 3 shows the inside of the housing 10 with the circumferential wall 113, and the rear wall 112 comprising the track 6, which in this embodiment is a groove but could also be a protruding element. It is clearly visible in the side view, that the track 6 is placed eccentrically to the centre of the rotary drive shaft 3. At the top portion 12, the curved shape of the cutout 15 at the inlet 20 is shown. The curved shape of the cutout 15 could have a positive effect on the force applied to the biological material fed through the inlet 20, decreasing the mortality rate of the biological material. Furthermore, the profile of the locking mechanism 30 is visible.

Figure 4:
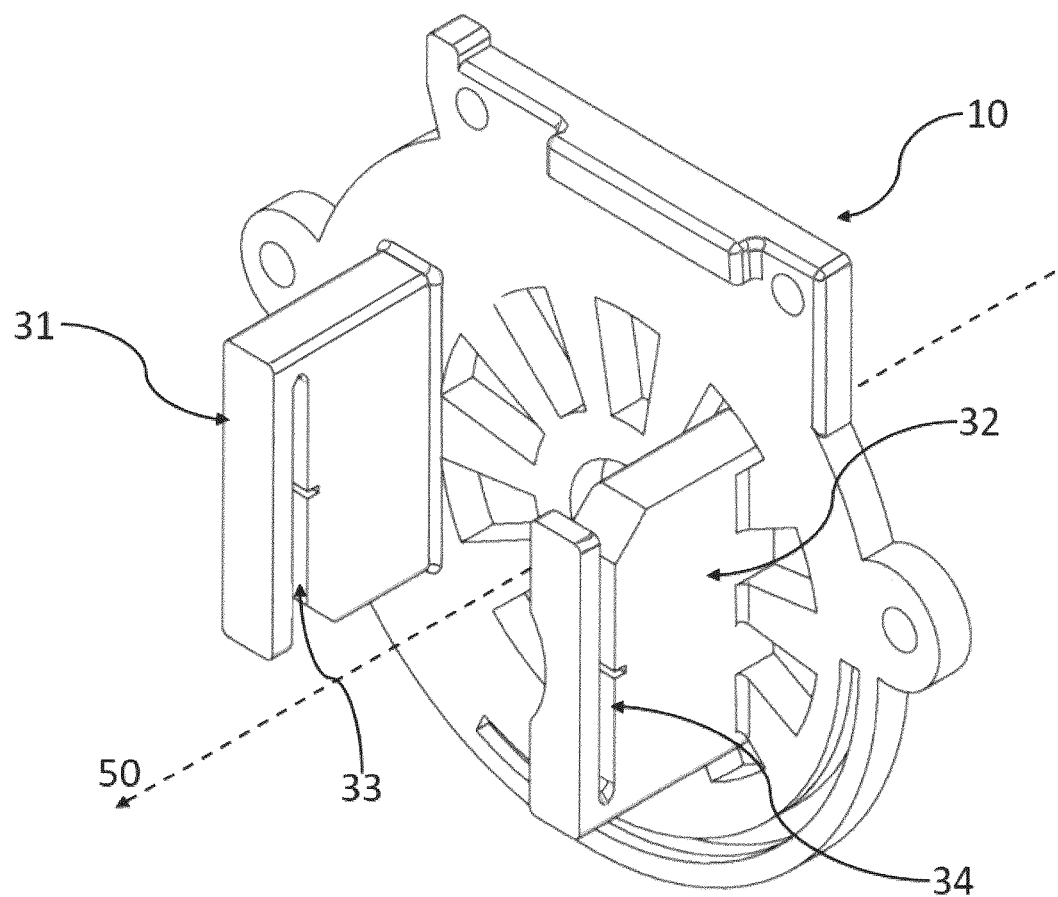
FIG. 4 is a trimetric view of a part of the dispensing unit in FIG. 2.

FIG. 4 is a trimetric view of a part of the dispensing unit 1 in FIG.s 1-3. FIG. 4 shows the outside of the housing 10 with first and second mounting brackets 31, 32 for a motor (not shown), each bracket having a slot 33, 34 wherein the two slots 33, 34 face opposite ways so as to enable interlocking with the motor by performing a clockwise twisting motion of the motor in respect to the brackets 31, 32, about the drive shaft axis 50.

Figure 5:
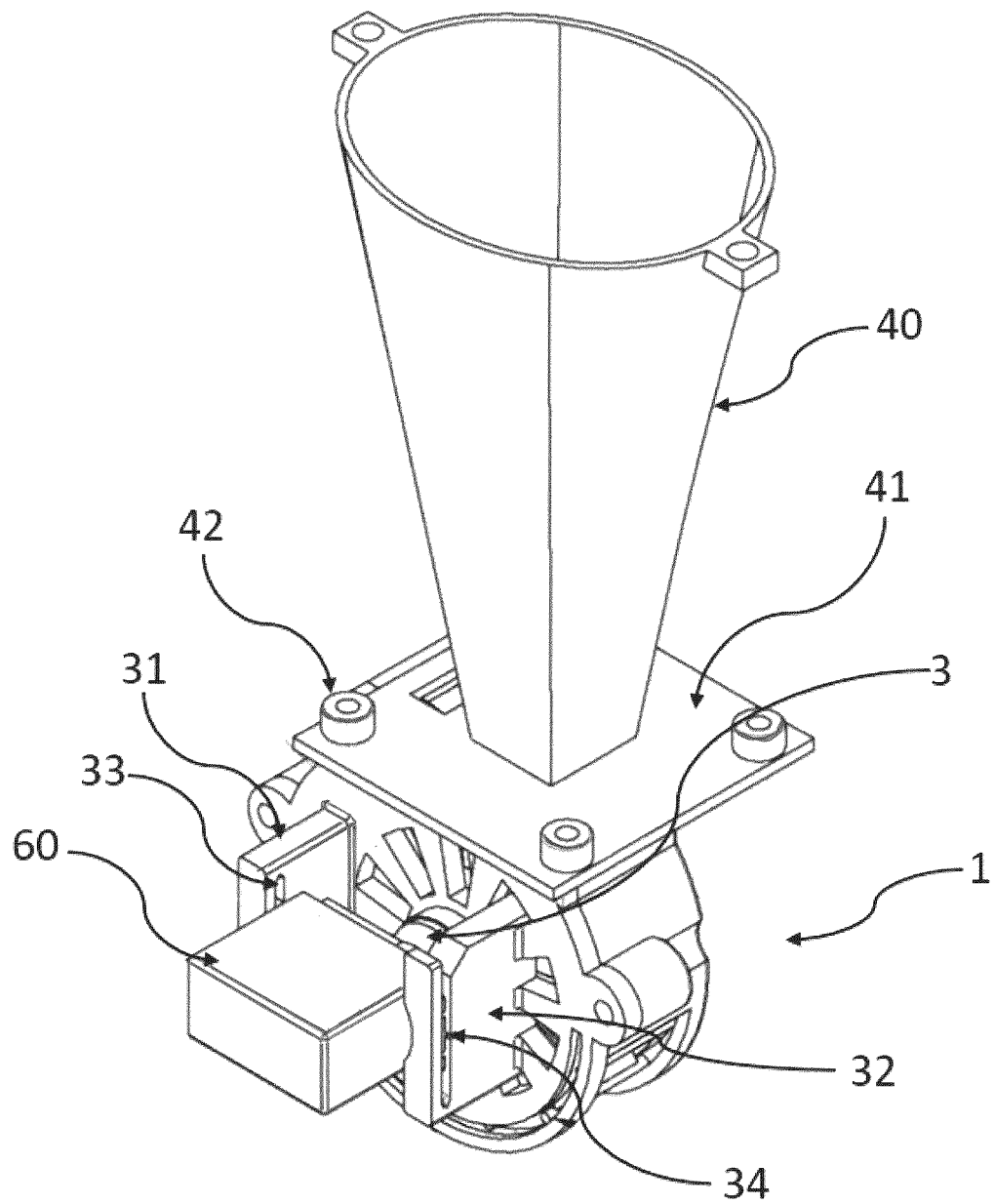
FIG. 5 is a trimetric view of an assembly of the dispensing unit.

FIG. 5 is a trimetric view of an assembly of the dispensing unit 1. FIG. 5 shows the dispensing unit 1 with the container 40 attached through a mounting plate 41, the mounting plate having several protruding cylinders 42 for easier assembly and correct fixation. Furthermore, FIG. 5 shows the motor 60 interlocked to the brackets 31, 32 through the slots 33, 34 and the motor being connected to the rotary arrangement inside the housing 10 through the drive shaft 3.

Figure 6:
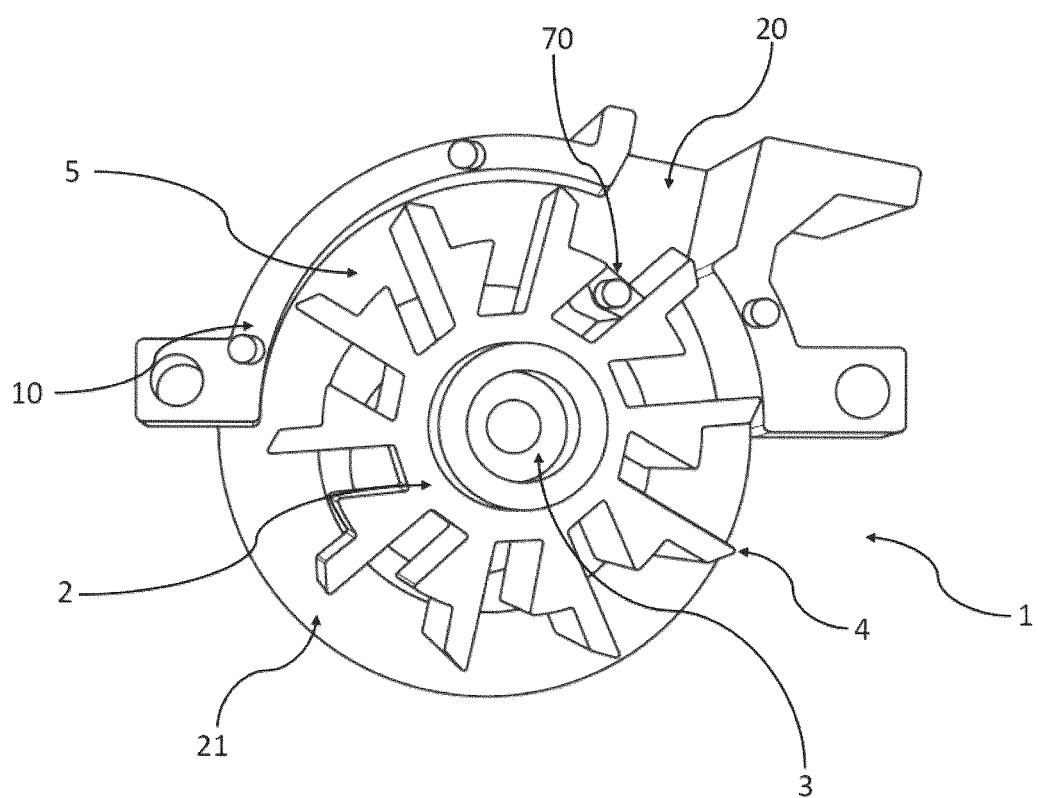
FIG. 6 is a side view of a cross-section of a second embodiment of a dispensing unit; the front wall is removed.

FIG. 6 is a side view of a second embodiment of a dispensing unit 1 according to the invention; as for FIG. 1, the front wall has been removed to make the other parts visible. FIG. 6 shows the inside of the housing 10, with the inlet 20 at the top of the housing 10. The fixed length vanes 4, divide the space inside the housing 10 into chambers 5 also having sides thereof formed by part of the rear wall 112, part of the front wall 111, and a side surface of the movable elements 70. The volume of the chambers 5 is controlled by the radial movement of the movable elements 70 towards and away from the centre of the rotary arrangement 2 mounted on the drive shaft 3. At the bottom of the housing 10 the outlet opening 21 is shown. This movement of the movable elements 70 is obtained by having them engage with a track 6 formed on the rear wall 112 in this embodiment, but it could also be on the front wall.

Figure 7:
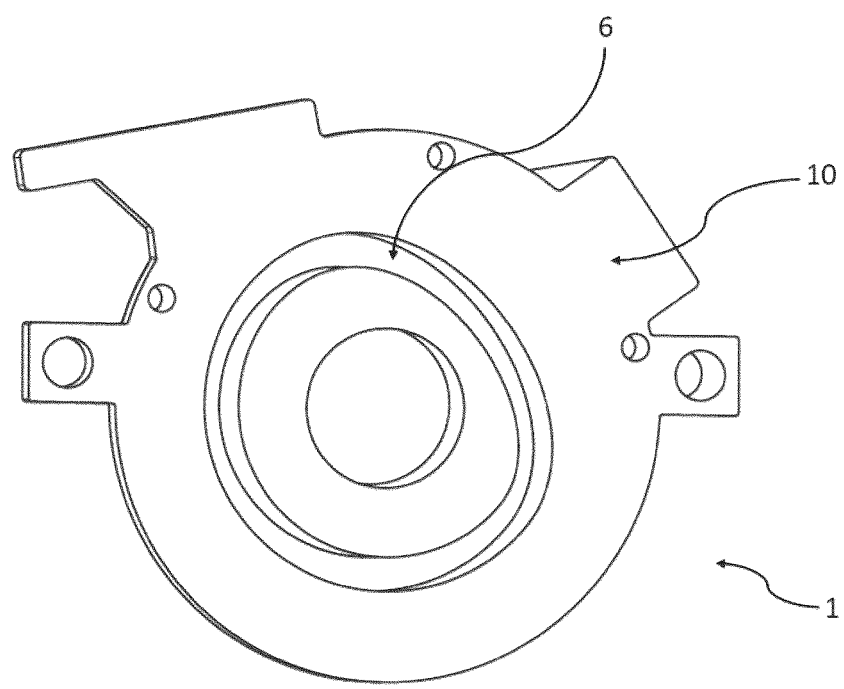
FIG. 7 is a side view of a possible design of the rear wall of the housing of the dispensing unit.

FIG. 7 is a side view of a rear wall of the dispensing unit excluding the rotary arrangement. FIG. 7 shows the the track 6, which in this embodiment is a protrusion, but it could also be a groove. It is clearly visible that the track 6 is placed eccentrically to the centre of the rotary drive shaft 3 and the track 6 is furthermore not circular, thus the track serves to move the movable element 70 in a direction perpendicular to the central axis of the drive shaft during each rotation. The specific shape and arrangement of a track will be designed as a part of a design process for a given dispensing unit 1.

Figure 8:
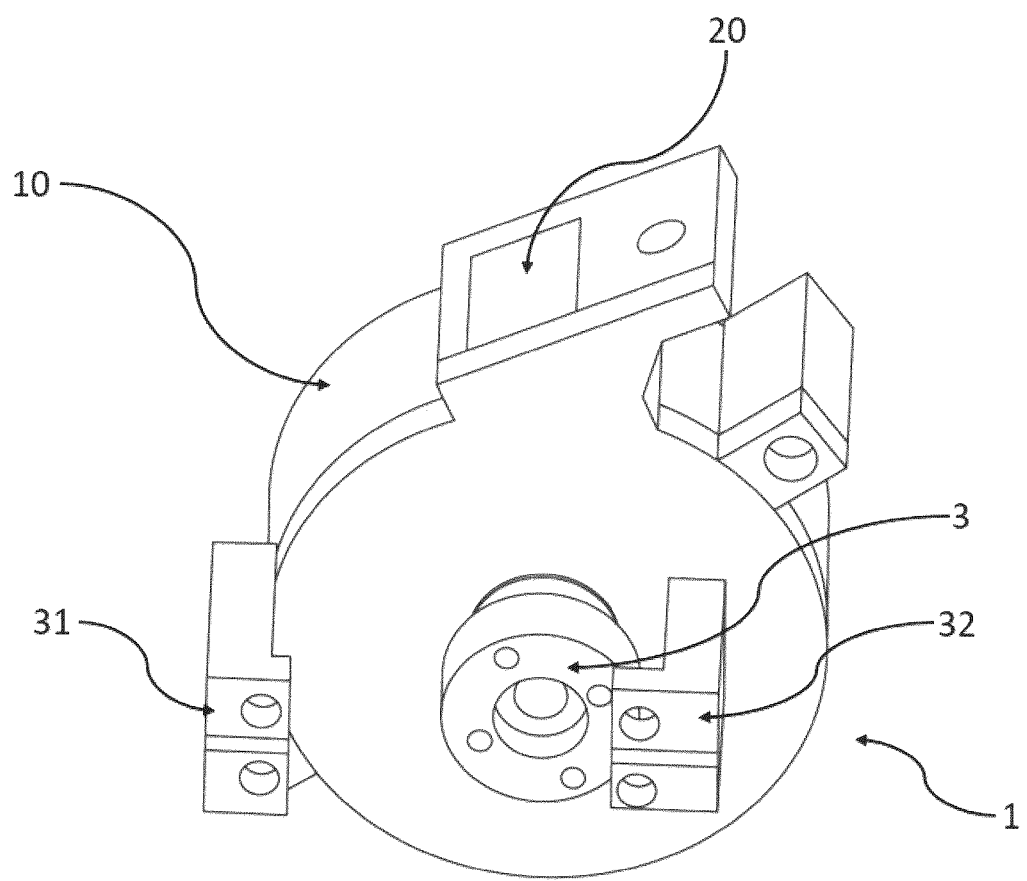
FIG. 8 is a trimetric view of an assembly of a second embodiment of the dispensing unit in FIG. 6 with the front wall mounted.

FIG. 8 is a trimetric view of an assembly of the second embodiment of the dispensing unit 1 having the front wall mounted. FIG. 8 shows the outside of the housing 10 with the inlet opening 20 at the top, the drive shaft 3 at the centre of the housing 10 and two mounting brackets 31, 32 for a motor (the motor is not shown in this figure, see FIG. 5).

Figure 9:
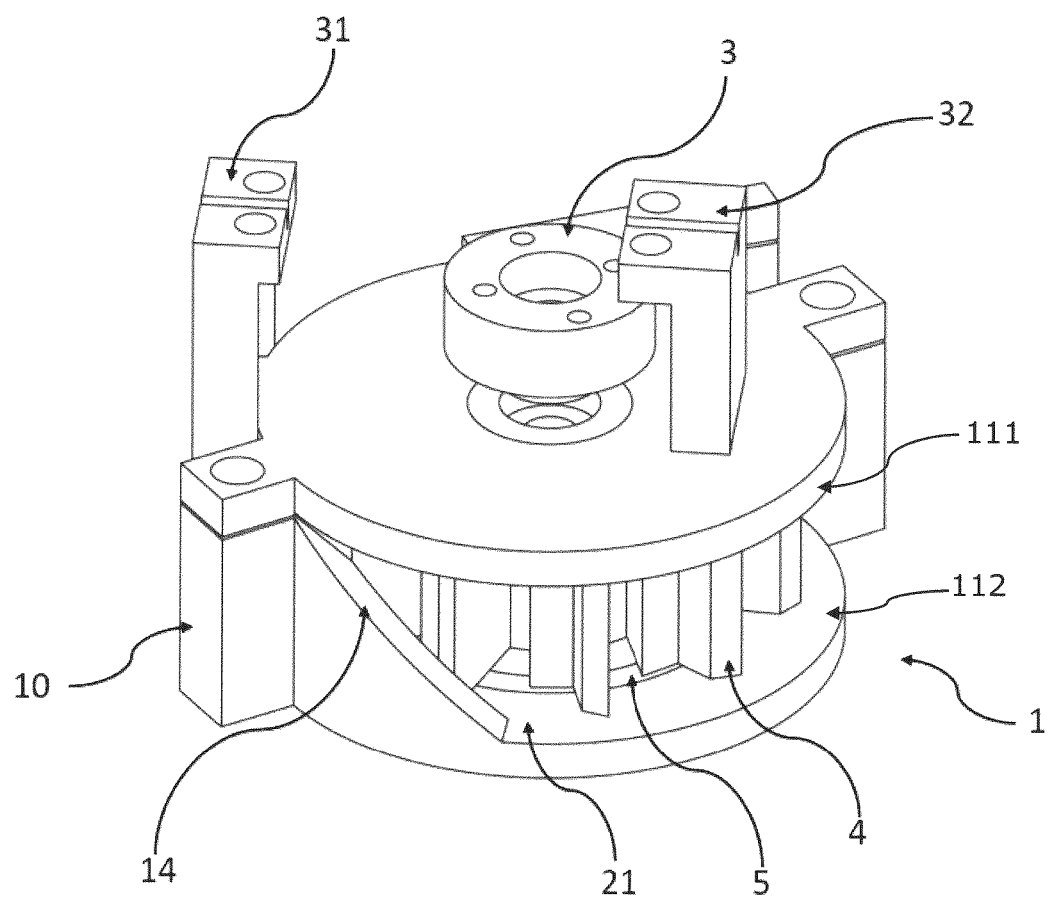
FIG. 9 is a trimetric view of an assembly of a second embodiment of the dispensing unit.

FIG. 9 is a trimetric view of an assembly of the second embodiment of the dispensing unit 1 in FIGS. 6-7. FIG. 9 shows the dispensing unit from an inferior angle, illustrating the outlet 21 with the cutout 14 having an inclined or oblique shape and chambers 5 between the vanes 4. Furthermore, the mounting brackets 31, 32 on each side of the drive shaft 3 are shown.

Figure 10:
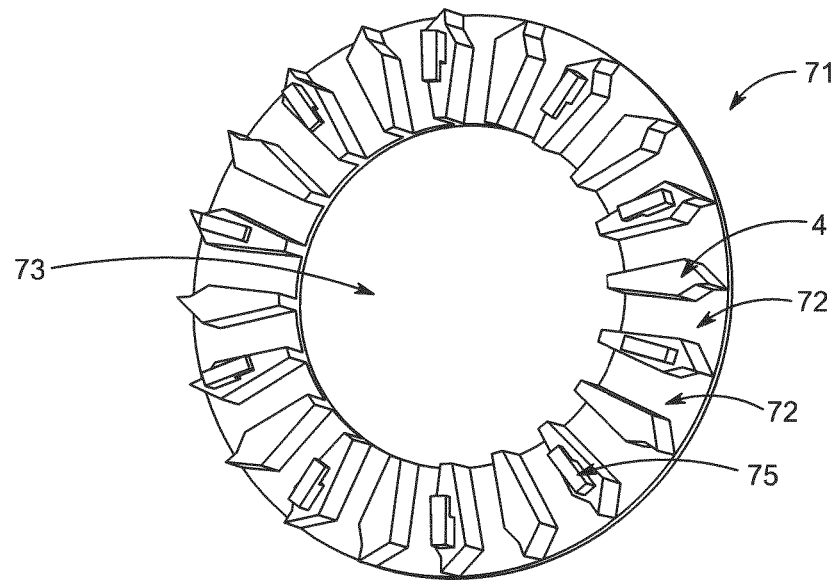
FIG. 10 is a side view of a vane carrier for use in a third embodiment of a dispensing unit according to the invention.
Figure 11:
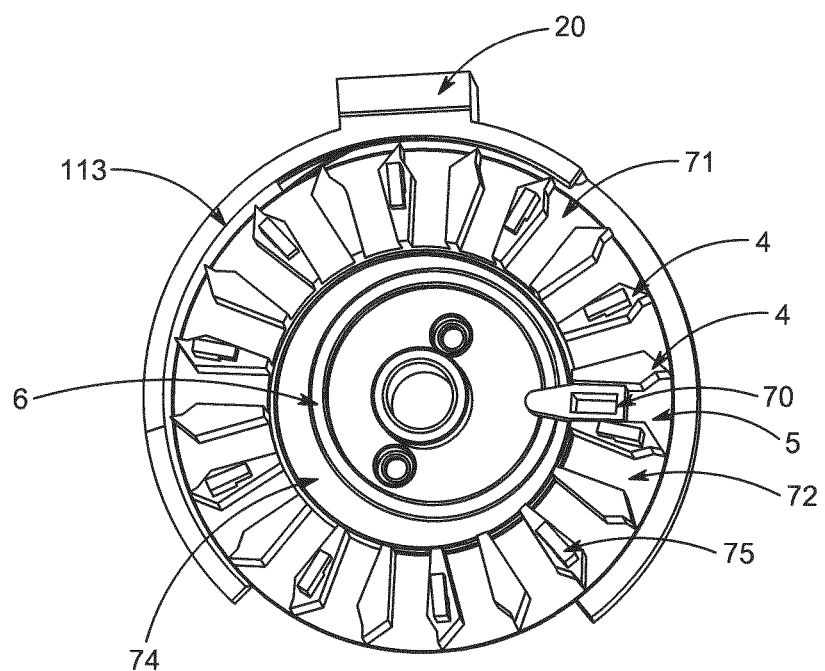
FIG. 11 is a side view of a third embodiment of the invention with the vane carrier in FIG. 10 inserted.

FIG. 10 is a side view of a vane carrier 71 for use in a third embodiment of a dispensing unit according to the invention. FIG. 11 is a side view of the third embodiment with the vane carrier in FIG. 10 inserted. FIG. 11 shows one of the movable elements 70 only, but when ready for use, such movable elements 70 are arranged between all of the vanes 4 to each form a side of a chamber 5. In this illustrated third embodiment, the rotary arrangement comprises the vane carrier 71 on which the vanes 4 are arranged. A surface 72 of the vane carrier 71 between the vanes 4 forms part of an inner front side or rear side of the chambers 5 so that the movable elements 70 slide along this surface 72 of the vane carrier 71. This means that this surface 72 rotates together with the biological material contained in the chambers 5 so that friction against this surface 72 can be avoided. The rotation is transferred from the drive shaft 3 to the vane carrier 71 by having them connected, e.g. by snap or click-on solutions.

Figure 12:
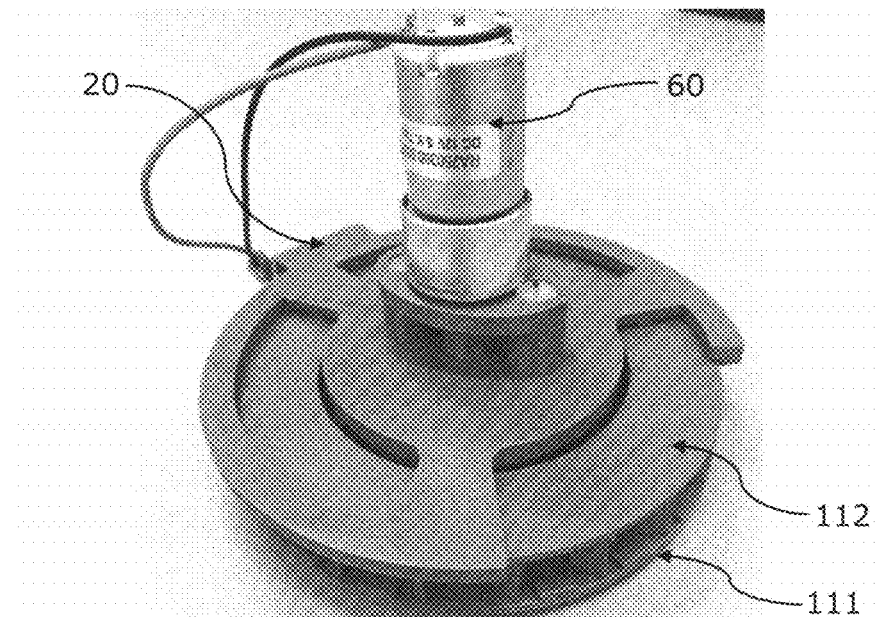
FIG. 12 is a trimetric rear view of the dispensing unit in FIG. 11.

FIG. 12 is a trimetric rear view of the dispensing unit in FIG. 11. FIG. 12 also shows the electric motor 60 driving the drive shaft.

As shown in FIG.s 10 and 11, in this embodiment, the vane carrier 71 comprises a central opening 73 exposing the track 6 so that it can engage with the indentations of the movable elements 70. In this embodiment, the track 6 is provided on a track carrier 74 forming part of the rear wall 112; in alternative embodiments, it could be on the front wall.

Figure 13:
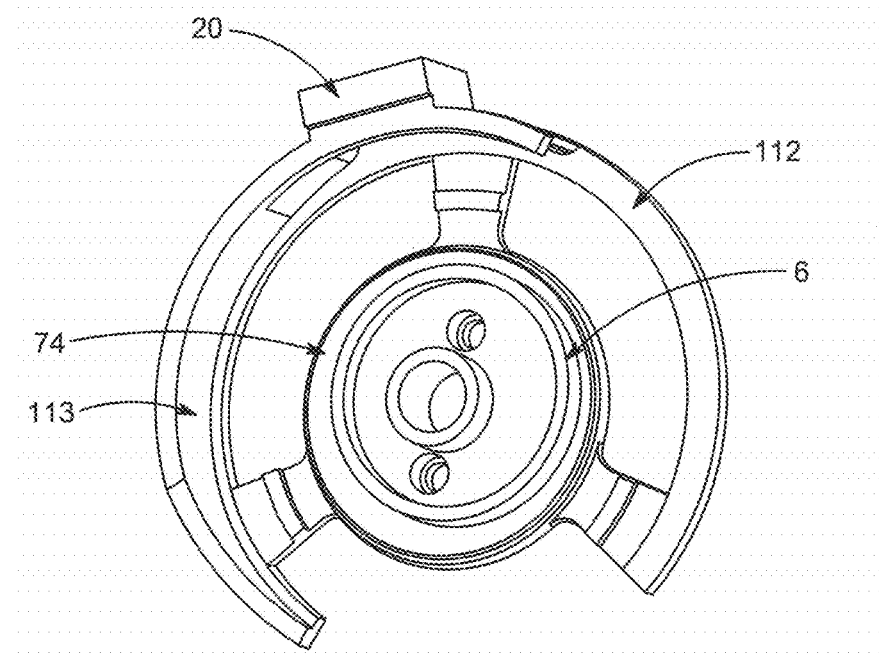
FIG. 13 is a side view of the rear wall and the circumferential wall of the embodiment in FIG. 11.

FIG. 13 is a side view of the rear wall 112 and the circumferential wall 113 of the embodiment in FIG. 11; in this embodiment, they are provided integrally as one unit forming part of the housing 10. FIG. 13 shows how the track carrier 74 forms part of the rear wall 112. The open regions in the rear wall 112 are provided so that excess debris, such as from a particulate carrier material, can escape from the dispensing unit.

Figure 14:
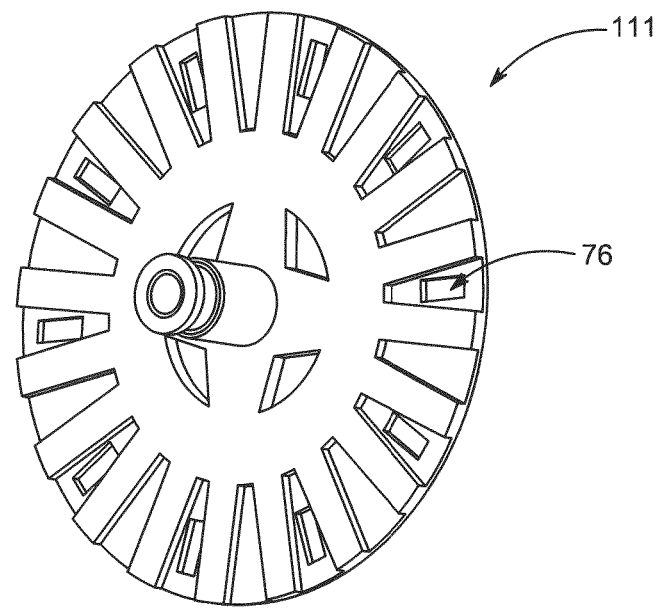
FIG. 14 is a side view of the front wall of the third embodiment showing the surface forming part of the chambers.

FIG. 14 is a side view of the front wall 111 of the third embodiment showing the surface forming part of the chambers 5. The front wall 111 of this embodiment is provided with locking holes 76 through which the locking protrusions 75 arranged on some of the vanes 4 can be made to extend when assembling the dispensing unit; the locking protrusions 75 are more clearly seen in FIG.s 10 and 11.

Figure 15:
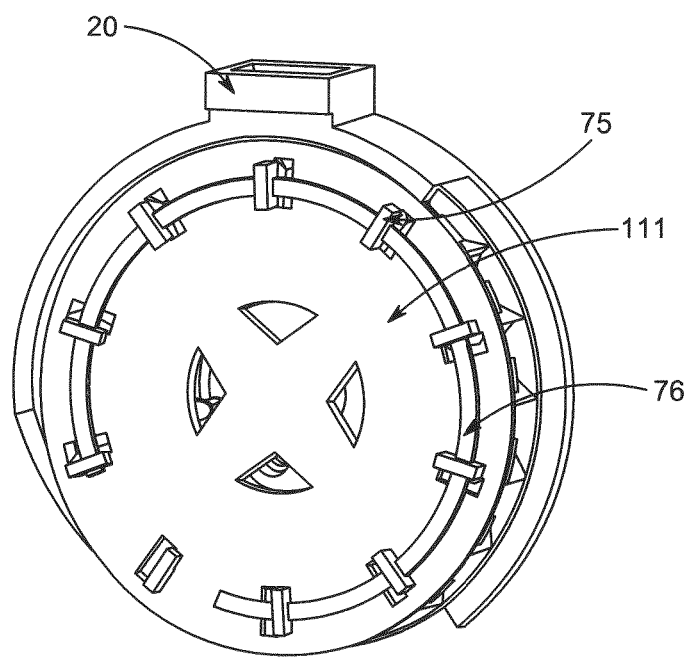
FIG. 15 is a side view of the third embodiment of the invention in an assembled state.

FIG. 15 is a side view of the third embodiment of the invention in an assembled state where a locking ring 76 is engaged with the locking protrusions 75 to provide a stable assembly of the dispensing unit. The locking ring 76 is preferably made in an elastically deformable material so that the locking ring 76 can be elastically deformed during the assembly.

Figure 16:
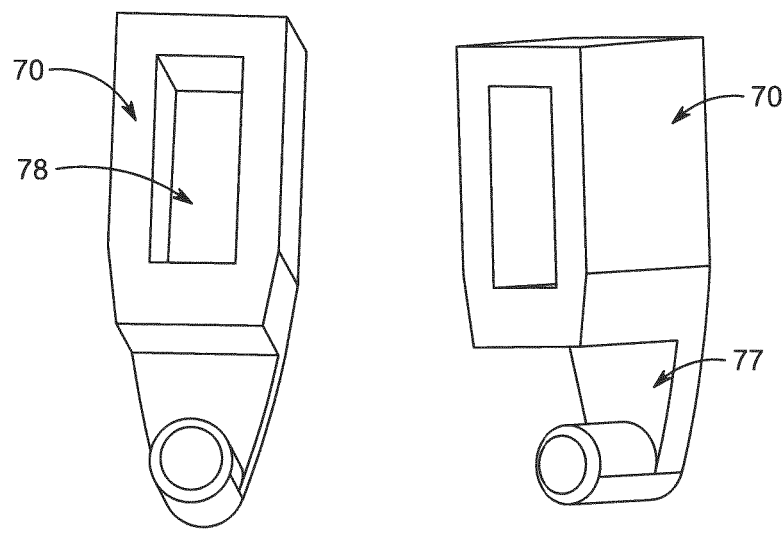
FIG. 16 shows one of the moveable elements in the third embodiment in FIG.s 11 to 15 as seen from two different angles.

FIG. 16 shows one of the moveable elements in the third embodiment in FIG.s 11 to 15 as seen from two different angles. The figures show the indentation 77 adapted to engage with the track 6. The holes 78 in the movable elements 70 are to save material and thereby weight.

Figure 17:
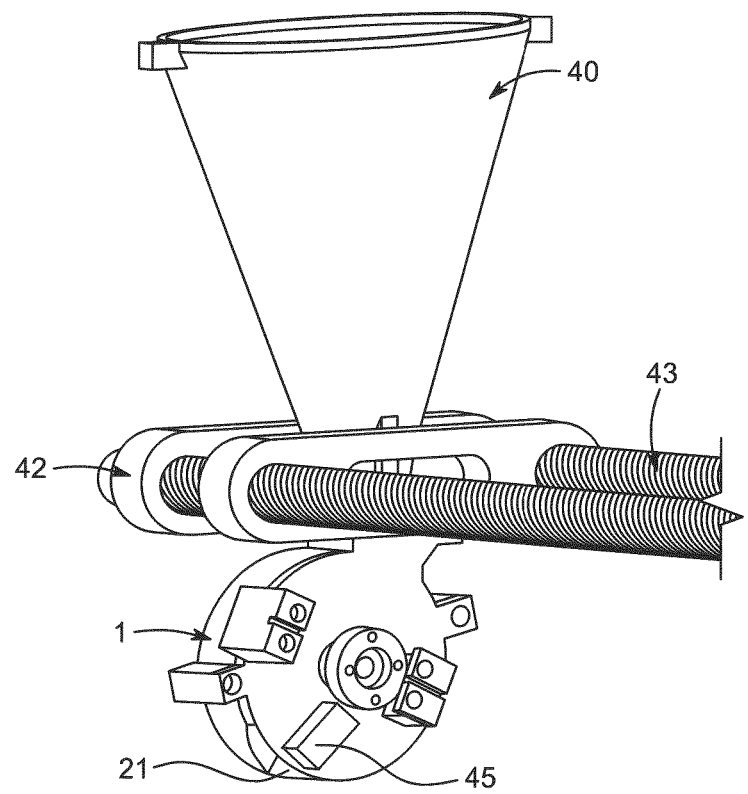
FIG. 17 is a trimetric view of an assembly of the dispensing unit including a container and elongate element for attachment to a vehicle.

FIG. 17 is a trimetric view of an assembly of the dispensing unit 1 including a container 40 and elongate elements 43 for attachment to a vehicle. FIG. 17 shows a structure 42 suitable for mounting a container 40 at one side and the dispensing unit 1 on the opposite side, the container 40 interlocking with the structure and/or the dispensing unit 1. Furthermore, the elongate elements 43 are connected to the structure 42, and the elongate elements are suitable for attachment to a vehicle, such as a UAV. In the embodiment in this figure, the dispensing unit 1 is further provided with a blower 45. It is shown schematically as a box but could have any suitable shape. The blower 45 is arranged to blow the biological material exiting the outlet opening 21 away from the dispenser unit 1 and to spread the biological material.

Figure 18:
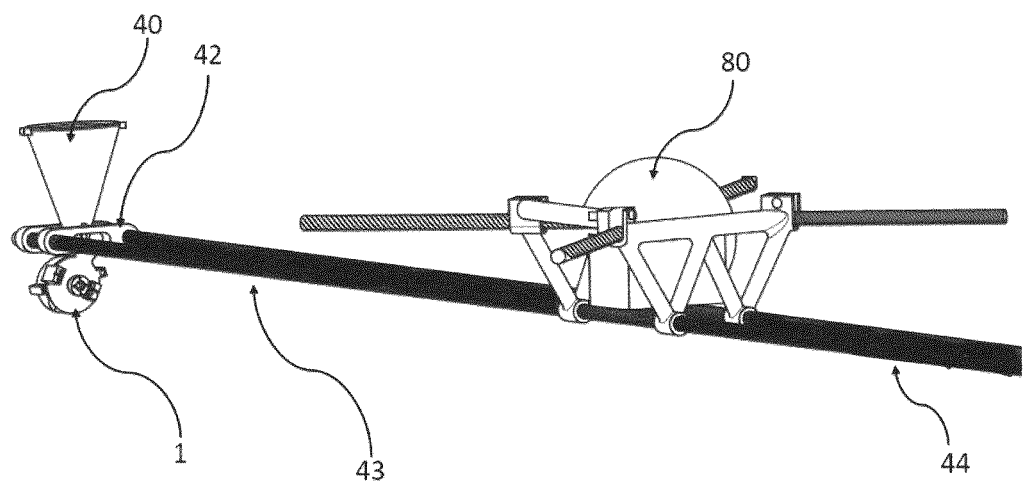
FIG. 18 is a trimetric view of an assembly of the dispensing unit including a UAV.

FIG. 18 is a trimetric view of an assembly of the dispensing unit 1 including a UAV 80, e.g. a drone driven by a plurality of electric motor driven propellers. FIG. 18 shows a UAV 80 at the centre of the image connected to the structure 42 through the elongate elements 43. The structure 42 is suitable for mounting a container 40 at one side and the dispensing unit 1 on the opposite side, the container 40 interlocking with the structure and/or the dispensing unit 1. On the opposite side of the dispensing unit 1, in relation the UAV 80, another elongate members 44 are prepared for a second dispensing unit to be mounted. Especially, two, three, four or more dispensing units could be mounted to one single UAV 80.

Figure 19:
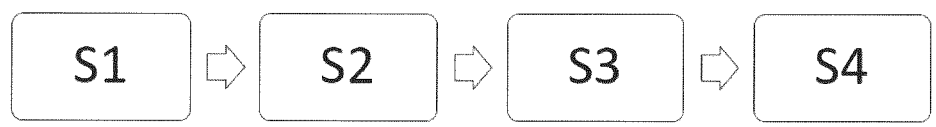
FIG. 19 is a flow chart of a method according to the invention.

FIG. 19 is a flow-chart of a method according to the invention. FIG. 19 illustrates a method for dispensing biological material, especially living insects or larvae, the method comprising the following steps:

S1 providing a container containing biological material, the container being suitable for tempered storage so as to lower the metabolism of the biological material, S2 providing a dispenser unit according to the invention, S3 moving the dispenser unit along a path within an area, and S4 dispensing biological material within the area from the dispenser unit moving along the path. Especially, the method may include mounting a plurality of dispenser units on one vehicle and dispensing biological material from the plurality of dispenser units simultaneously by the vehicle, e.g. a drone, moving along a path within an area.

Figure 20A:
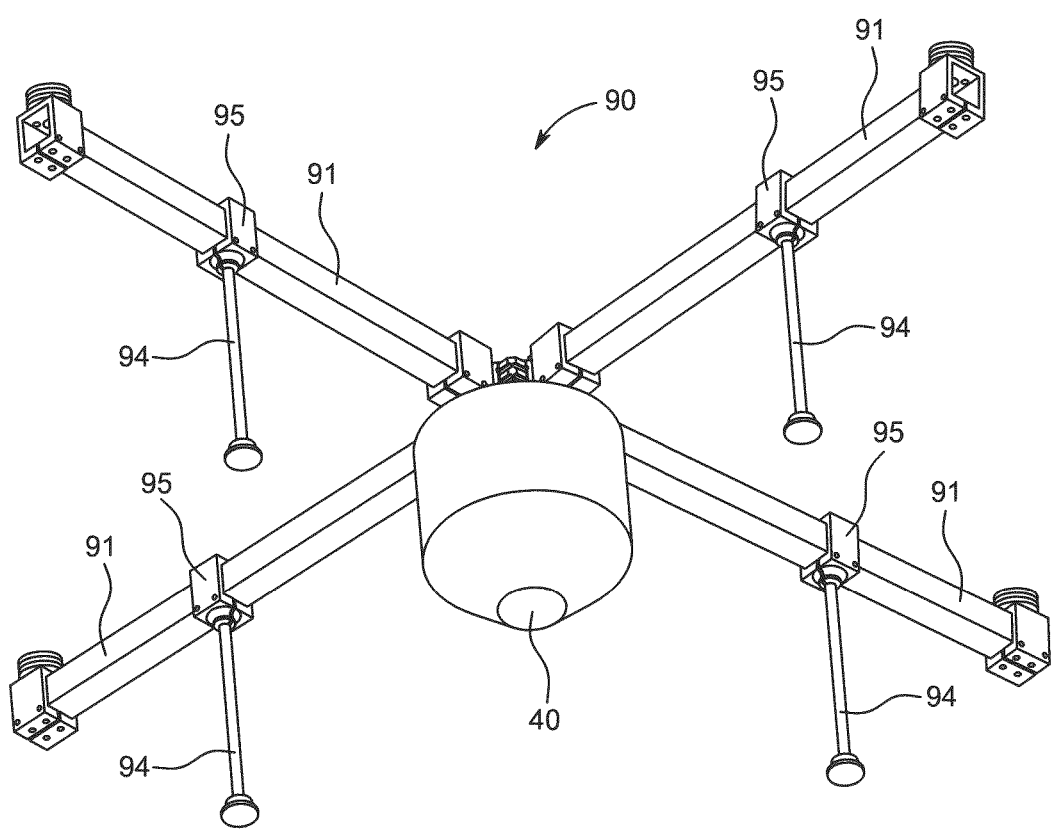
FIG. 20 shows a possible design of a drone body that may be used for carrying a dispenser unit according to the present invention.
Figure 20B:
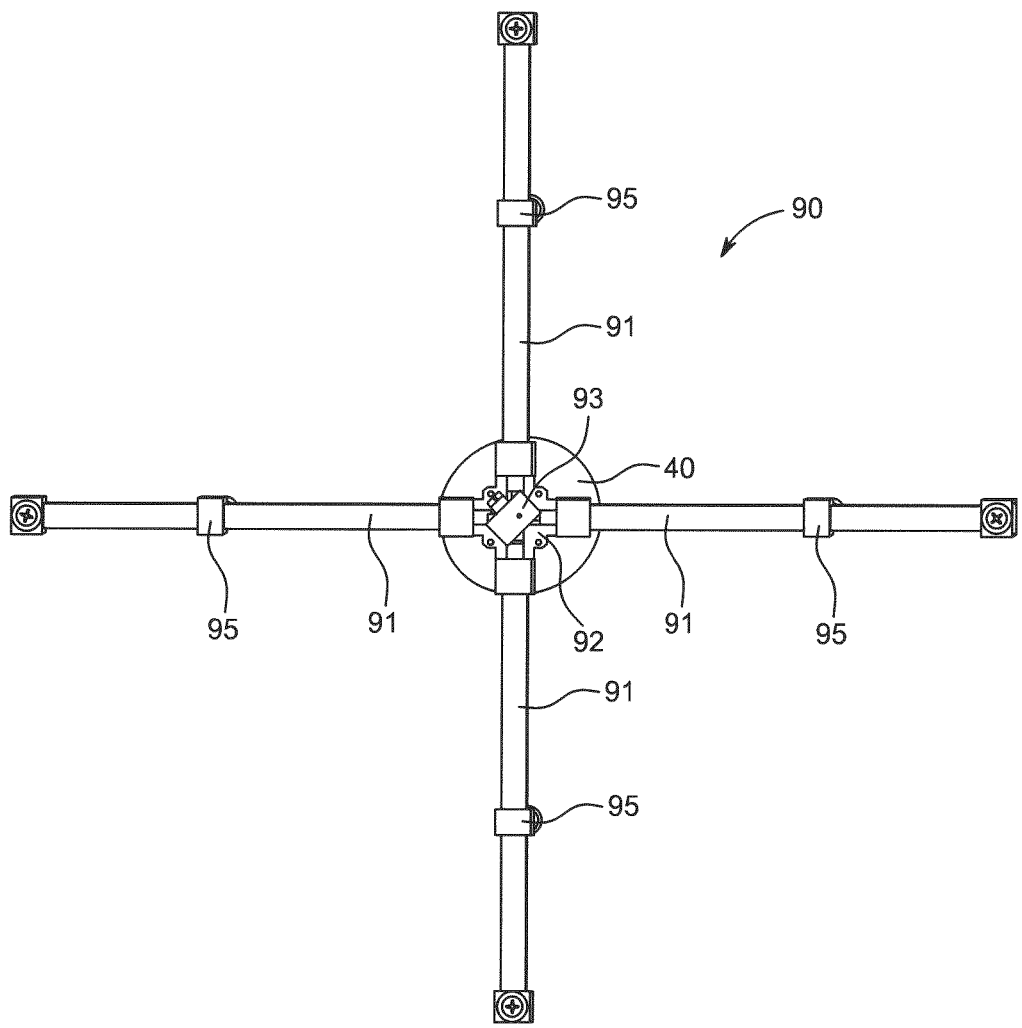
Figure 20C:
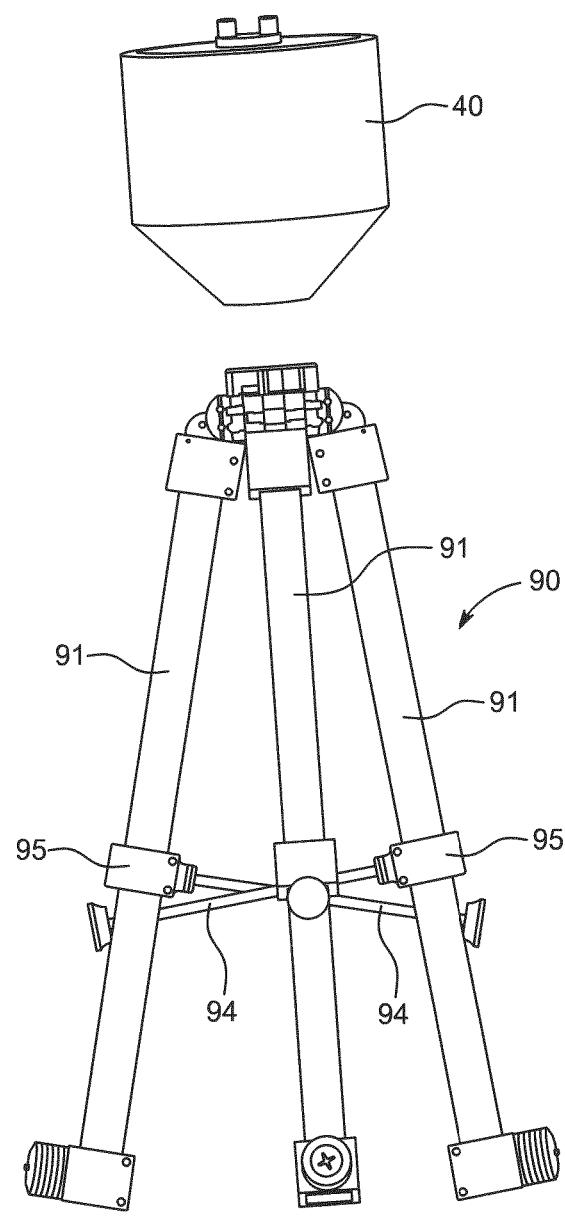

FIG. 20 shows a possible design of a drone body 90 that may be used for carrying a dispenser unit (not included in this figure) according to the present invention. This embodiment of the drone body 90 is designed so that it can be changed between an extended configuration, as in FIGS. 20A and 20B, ready for flying and a collapsed configuration, as in FIG. 20C, for storage and transportation. FIG. 20A is a three-dimensional view, and FIG. 20B is seen from above. The arms 91 of the drone body 90 are hingedly connected to a central section 92. They have a locking mechanism 93 for ensuring that the arms 91 remain in the extended configuration during use of the drone. The drone body 90 of this embodiment is further provided with legs 94 for allowing it to stand on the ground when not flying. The legs 94 are shown as mounted by brackets 95, but other ways of fastening the legs 94 would also be possible. By having such brackets mounted by bolts, it would e.g. be possible to replace the legs 94 with longer or shorter legs 94, if needed. In this figure, the dispenser unit is shown centrally arranged. However, it could also be arranged on one of the arms 91 or on a carrier element (not shown) extending from the central section 92 or from one or more of the arms 91.

To sum up, the invention provides a dispenser unit 1 for dispensing biological material, e.g. larvae or insects etc. The dispenser unit has a rotary arrangement 2 with a drive shaft 3 and a plurality of protruding vanes 4 positioned inside a housing 10 for encasing at the rotary arrangement to form chambers 5 for containing biological material between respective neighbouring vanes and an inner wall 11 of the housing. A track 6 on the front wall or the rear wall of the housing serves to engage with each vane or movable element to control the volume of the chambers between a temporary location below an inlet opening 20 in a top part and a temporary location above an outlet opening 21 in a bottom part of the housing. This allows the biological material to be received in the chambers at the inlet 20 and dispensed from the chambers at the outlet 22 during rotation of the rotary arrangement. In some embodiments of the invention, each of the vanes is mounted to be variable in length by protrusions on the vanes engaging with a groove 6 of the front wall or the rear wall of the housing to the vary length of the vanes during a full rotation to vary volume of the chambers during the rotation. In other embodiments, there are moveable elements arranged between the vanes so that the volume of the chambers can be varied by moving the movable elements radially with respect to the drive shaft. Preferably, the vanes (when movable) or the movable elements are controlled to provide an expanding chamber volume as the chamber is being rotated from the inlet to the outlet. The dispenser unit has proven provide a low mortality e.g. for dispensing living larvae, and it can be formed in lightweight material, e.g. 3D printed in a polymer. Furthermore, two or more dispensing units can be transported by a drone or the like to spread biological material over a large area.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. In addition, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A dispenser unit for dispensing biological material, said dispenser unit comprising:
    a rotary arrangement with a drive shaft and a plurality of protruding vanes, extending radially away from the drive shaft,
    a housing for encasing at least a part of the rotary arrangement to form chambers configured to contain biological material between respective neighbouring vanes and an inner wall of the housing, wherein the rotary arrangement is rotatably mounted in relation to the housing, and wherein the inner wall of the housing comprises a front wall, a rear wall arranged at a distance along the drive shaft from the front wall, and a circumferential wall,
    an inlet opening in the circumferential wall in a top part of the housing and being configured to receive biological material into at least one of said chambers at a time, the inlet opening facing upwards when the dispenser unit is in use, so that the biological material can enter a chamber temporarily located below the inlet opening by gravitational forces acting on the biological material,
    an outlet opening placed in a bottom part of the housing to allow the biological material to be dispensed from the chambers during rotation of the rotary arrangement, the outlet opening facing downwards when the dispenser unit is in use, so that the biological material can exit a chamber temporarily located above the outlet opening by gravitational forces acting on the biological material, and
    a track formed on the inside of the front wall and/or of the rear wall of the housing, the track engaging with a corresponding protrusion or indentation on each vane so as to vary the position of that vane relative to the rotary drive shaft during a revolution of the rotary arrangement,
        wherein the rotary arrangement is eccentrically mounted in relation to a center of a cross section of the circumferential wall of the housing perpendicular to the axis of rotation of the drive shaft,
    wherein the vanes are slidably mounted in respective slits of a central body of the rotary arrangement, so as to allow lengths of the vanes to vary during a revolution of the rotary arrangement in order for an end of each vane to be able to remain adjacent to the circumferential wall during movement from the inlet opening to the outlet opening to maintain a closed chamber, and
    wherein the track is shaped and arranged so that for each of the chambers, the volume increases when the chamber is moved from a location below the inlet opening to a location above the outlet opening.

2. A dispenser unit for dispensing biological material, said dispenser unit comprising:
    a rotary arrangement with a drive shaft and a plurality of protruding vanes having fixed lengths and extending radially away from the drive shaft,
    a housing for encasing at least a part of the rotary arrangement to form chambers configured to contain biological material between respective neighbouring vanes and an inner wall of the housing, wherein the rotary arrangement is rotatably mounted in relation to the housing, and wherein the inner wall of the housing comprises a front wall, a rear wall arranged at a distance along the drive shaft from the front wall, and a circumferential wall,
    a plurality of movable elements each arranged between two neighbouring vanes so that it forms an inner side of the respective chamber, the inner side being opposite to an outer side of the respective chamber being formed by the circumferential wall of the housing,
    an inlet opening in the circumferential wall in a top part of the housing and being configured to receive biological material into at least one of said chambers at a time, the inlet opening facing upwards when the dispenser unit is in use, so that the biological material can enter a chamber temporarily located below the inlet opening by gravitational forces acting on the biological material,
    an outlet opening placed in a bottom part of the housing to allow the biological material to be dispensed from the chambers during rotation of the rotary arrangement, the outlet opening facing downwards when the dispenser unit is in use, so that the biological material can subsequently exit a chamber temporarily located above the outlet opening by gravitational forces acting on the biological material, and
    a track, positioned eccentrically relative to the axis of rotation of the drive shaft, formed on the inside of the front wall and/or of the rear wall of the housing, the track engaging with a corresponding protrusion or indentation on each movable element so as to vary the radial position of that movable element relative to the rotary drive shaft during a revolution of the rotary arrangement, wherein the track is shaped and arranged so that for each of the chambers, the volume increases when the chamber is moved from a location below the inlet opening to a location above the outlet opening.

3. The dispenser unit according to claim 2, wherein the rotary arrangement comprises a vane carrier on which the vanes are arranged, a surface of the vane carrier between the vanes forming part of an inner front side or rear side of the chambers so that the movable elements slide along this surface of the vane carrier, and the vane carrier comprising a central opening exposing the track so that it can engage with the protrusions or indentations of the movable elements.

4. The dispenser unit according to claim 3, wherein the track is provided on a track carrier forming part of the front wall or the rear wall.

5. The dispenser unit according to claim 1, wherein the pressure inside a chamber will remain substantially constant at the ambient pressure despite the change in volume of the chamber when it is moved between the inlet opening and the outlet opening.

6. The dispenser unit according to claim 1, wherein a cut-out in an inner surface of the circumferential wall of the housing provides a gap between the vanes and the housing at the region after the inlet opening in the rotational orientation of the rotational arrangement.

7. The dispenser unit according to claim 1, wherein the circumferential wall at the outlet opening is provided with a cutout, gradually widening an outlet area as the chambers pass the outlet opening, so that the outlet area from the chambers increase continuously in size from no opening to a full size opening to facilitate that a uniform flow of biological material out of the outlet opening can be obtained.

8. The dispenser unit according to claim 1, the dispenser unit further comprising:
a detachable container, for storage of biological material to be dispensed, the container being configured to attach to and detachment from the housing for application of the biological material to the inlet opening of the housing.

9. The dispenser unit according to claim 1, further comprising:
a motor connected to the drive shaft and configured to rotate the rotary arrangement, and
a controller configured to start, stop, and control the speed of the motor.

10. The dispenser unit according to claim 1, wherein at least the housing is formed by a material selected from: a polymer material, plastic, carbon fibers, plant fibers, aluminum or steel.

11. The dispenser unit according to claim 1, wherein at least a part thereof has been made by 3D printing.

12. A system for dispensing biological material, the system comprising
at least one dispenser unit according to claim 2,
at least one motor arranged to drive the rotary arrangement of the at least one dispenser unit, and
an elongate element configured to attach the housing of each of the at least one dispenser unit to a structure of a vehicle.

13. The system according to claim 12, wherein the system further comprises a blower for each of the at least one dispenser unit, which blower is configured to blow the biological material exiting the outlet opening away from the dispenser unit and away from the vehicle on which the dispenser unit is attached.

* * * * *